(12) United States Patent
Cahen et al.

(10) Patent No.: US 9,049,960 B2
(45) Date of Patent: Jun. 9, 2015

(54) ONE HAND CARRIABLE LIQUID FOOD OR BEVERAGE MACHINE

(75) Inventors: Antoine Cahen, Lausanne (CH); Stefan Kaeser, Aarau (CH); Alexandre Kollep, Lutry (CH); Frank Kräuchi, Epautheyres (CH); Matthieu Ozanne, Chessel (CH); Alfred Yoakim, St-Legier-La Chiesaz (CH)

(73) Assignee: Nestec S.A., Vevey (CH)

( * ) Notice: Subject to any disclaimer, the term of this patent is extended or adjusted under 35 U.S.C. 154(b) by 537 days.

(21) Appl. No.: 12/747,841

(22) PCT Filed: Dec. 9, 2008

(86) PCT No.: PCT/EP2008/067075
§ 371 (c)(1),
(2), (4) Date: Jun. 11, 2010

(87) PCT Pub. No.: WO2009/074553
PCT Pub. Date: Jun. 18, 2009

(65) Prior Publication Data
US 2010/0263547 A1    Oct. 21, 2010

(30) Foreign Application Priority Data
Dec. 12, 2007 (EP) .................... 07123009

(51) Int. Cl.
*A47J 31/00* (2006.01)
*A47J 31/44* (2006.01)
*A47J 31/18* (2006.01)

(52) U.S. Cl.
CPC ........ *A47J 31/4403* (2013.01); *Y10T 29/49826* (2015.01); *A47J 31/18* (2013.01); *A47J 31/4421* (2013.01); *A47J 31/4485* (2013.01); *A47J 2201/00* (2013.01)

(58) Field of Classification Search
CPC ....... A47J 31/00; A47J 31/06; A47J 31/0652; A47J 31/0657; A47J 31/10; A47J 31/40; A47J 31/057; A47J 31/103; A47J 31/24
USPC ............ 99/279, 289 R, 288, 295, 300, 302 R, 99/495; 220/4.33, 7; 229/164, 198.3
See application file for complete search history.

(56) References Cited

U.S. PATENT DOCUMENTS 2,927,533 A    3/1960   Luehrs
3,218,955 A    11/1965  Lorang ........................... 99/282
(Continued)

FOREIGN PATENT DOCUMENTS

AT    410377    4/2003
CH    682 798   11/1993
(Continued)

OTHER PUBLICATIONS p. 66 of the official Diary of Chile listing CL 3721-08 (corresponding to US 2010/0263543A1) dated Jan. 8, 2010.
(Continued)

*Primary Examiner* — Brian Jennison
(74) *Attorney, Agent, or Firm* — Winston & Strawn LLP

(57) ABSTRACT

A machine for preparing a liquid food or beverage has an outermost housing that includes a top part and downwardly extending sidewalls which cover and shield at least part of a liquid food or beverage module. The downwardly extending sidewalls have a portion that forms, optionally together with a portion of the top part, a grip seizable by a human hand such that the machine can be carried and displaced single handed by seizure of the grip.

17 Claims, 3 Drawing Sheets

(56) References Cited

U.S. PATENT DOCUMENTS

| | | | |
|---|---|---|---|
| 3,938,492 A | 2/1976 | Mercer, Jr. | |
| 4,054,085 A | 10/1977 | Tarr | |
| 4,164,306 A | 8/1979 | Perrin | |
| 4,253,385 A | 3/1981 | Illy | 99/281 |
| 4,377,049 A | 3/1983 | Simon et al. | 40/465 |
| 4,389,925 A | 6/1983 | Piana | |
| 4,458,735 A | 7/1984 | Houman | 141/95 |
| 4,554,419 A | 11/1985 | King et al. | 200/5 |
| 4,681,495 A | 7/1987 | Crespin et al. | 411/298 |
| 4,757,753 A | 7/1988 | Pandolfi | |
| 4,767,632 A | 8/1988 | Meier | 426/231 |
| 4,829,888 A | 5/1989 | Webster et al. | |
| 4,892,031 A | 1/1990 | Webster et al. | |
| 4,954,697 A | 9/1990 | Kokubun et al. | 235/381 |
| 5,036,998 A | 8/1991 | Dunn | |
| 5,161,455 A | 11/1992 | Anson et al. | 99/280 |
| 5,193,701 A * | 3/1993 | Bush et al. | 220/4.33 |
| 5,312,020 A | 5/1994 | Frei | 222/129.1 |
| 5,335,705 A | 8/1994 | Morishita et al. | 141/275 |
| 5,353,692 A | 10/1994 | Reese et al. | 99/289 |
| 5,372,061 A | 12/1994 | Albert et al. | 99/281 |
| 5,375,508 A | 12/1994 | Knepler et al. | 99/280 |
| 5,498,757 A | 3/1996 | Johnson et al. | |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,855,161 A | 1/1999 | Cortese | |
| 5,890,615 A | 4/1999 | Petras | |
| 5,916,351 A | 6/1999 | Sintchak | |
| 5,927,553 A | 7/1999 | Ford | 222/129.4 |
| 5,959,869 A | 9/1999 | Miller et al. | 364/479.01 |
| 5,992,298 A | 11/1999 | Illy et al. | |
| 6,029,562 A | 2/2000 | Sintchak | 99/275 |
| 6,062,127 A | 5/2000 | Klosinski et al. | 99/303 |
| 6,123,010 A | 9/2000 | Blackstone | 99/284 |
| 6,182,555 B1 | 2/2001 | Scheer et al. | 99/290 |
| 6,213,336 B1 | 4/2001 | Lin | |
| 6,325,312 B1 * | 12/2001 | Karkos, Jr. | 241/100 |
| 6,345,570 B1 | 2/2002 | Santi | |
| 6,354,341 B1 | 3/2002 | Saveliev et al. | 141/94 |
| 6,582,002 B2 | 6/2003 | Hogan et al. | |
| 6,759,072 B1 | 7/2004 | Gutwein et al. | 426/433 |
| 7,028,603 B1 | 4/2006 | Gremillion et al. | 99/290 |
| 7,093,533 B2 | 8/2006 | Tebo, Jr. et al. | |
| 7,210,401 B1 * | 5/2007 | Rolfes et | 99/289 R |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 8,695,484 B2 | 4/2014 | Mori | |
| 8,800,433 B2 | 8/2014 | Cahen et al. | |
| 2002/0185016 A1 | 12/2002 | Hoffjann et al. | |
| 2003/0070555 A1 | 4/2003 | Reyhanloo | 99/282 |
| 2004/0015263 A1 | 1/2004 | Chadwell et al. | 700/216 |
| 2005/0015263 A1 | 1/2005 | Beal et al. | 705/1 |
| 2005/0258186 A1 | 11/2005 | Hart et al. | |
| 2006/0115041 A1 * | 6/2006 | Roncaglioni et al. | 378/37 |
| 2007/0056994 A1 * | 3/2007 | Woodnorth et al. | 222/221 |
| 2007/0062378 A1 | 3/2007 | Glucksman et al. | |
| 2007/0157820 A1 | 7/2007 | Bunn | 99/275 |
| 2007/0175338 A1 | 8/2007 | Glucksman et al. | |
| 2009/0101021 A1 | 4/2009 | Tonelli et al. | 99/290 |
| 2009/0173235 A1 | 7/2009 | Kollep et al. | 99/279 |
| 2010/0251900 A1 | 10/2010 | Cahen et al. | 99/323.1 |
| 2010/0263543 A1 | 10/2010 | Krauchi et al. | 99/280 |
| 2010/0263550 A1 | 10/2010 | Cahen et al. | 99/323.1 |
| 2010/0300301 A1 | 12/2010 | Cahen et al. | 99/323.1 |
| 2011/0041698 A1 | 2/2011 | Mori | 99/290 |

FOREIGN PATENT DOCUMENTS

| | | |
|---|---|---|
| CN | 2235252 Y | 9/1996 |
| CN | 1209041 A | 2/1999 |
| CN | 2387836 | 7/2000 |
| CN | 2682954 Y | 3/2005 |
| CN | 1875831 | 12/2006 |
| DE | 44 29 353 | 2/1996 |
| DE | 20 2006 002 124 | 5/2006 |
| DE | 20 2006 019 039 | 4/2007 |
| DE | 102006060748 | 1/2008 |
| EP | 0 549 887 | 7/1993 |
| EP | 0 838 186 | 4/1998 |
| EP | 1 440 639 | 7/2004 |
| EP | 1 448 084 | 8/2004 |
| EP | 1 676 509 | 7/2006 |
| EP | 1 707 088 | 10/2006 |
| EP | 1 731 065 | 12/2006 |
| EP | 1772081 A1 | 4/2007 |
| EP | 1 798 457 | 6/2007 |
| EP | 1 859 713 | 11/2007 |
| EP | 08155851.2 | 11/2007 |
| EP | 1 864 598 | 12/2007 |
| EP | 1 867 260 | 12/2007 |
| EP | 1 878 368 | 1/2008 |
| EP | 2 070 454 | 6/2009 |
| EP | 08155753.0 | 6/2009 |
| FR | 2 440 720 | 11/1979 |
| FR | 2 544 185 A3 | 10/1984 |
| FR | 2 554 185 | 5/1985 |
| FR | 2 624 844 | 6/1989 |
| FR | 2648695 A1 | 12/1990 |
| GB | 2 397 510 | 7/2004 |
| GB | 2 421 423 | 6/2006 |
| JP | 50054990 A | 5/1975 |
| JP | 51135081 U | 11/1976 |
| JP | 52138542 U | 10/1977 |
| JP | 54065788 U | 5/1979 |
| JP | 55-128626 U1 | 9/1980 |
| JP | S59174120 A | 10/1984 |
| JP | 61119218 A | 6/1986 |
| JP | 62-100138 U | 6/1987 |
| JP | H0638880 A2 | 2/1994 |
| JP | 11253330 A2 | 9/1999 |
| JP | 2001222761 A | 8/2001 |
| JP | 2002191505 A | 7/2002 |
| JP | 2004527893 A | 9/2004 |
| JP | 2006341097 A | 12/2006 |
| LU | 85318 | 9/1984 |
| RU | 2294875 C2 | 3/2007 |
| SU | 1797482 A3 | 2/1993 |
| WO | WO97/24052 | 7/1997 |
| WO | WO 97/25634 | 7/1997 |
| WO | WO 99/50172 | 10/1999 |
| WO | WO 01/52704 A1 | 7/2001 |
| WO | WO 02/059534 | 8/2002 |
| WO | WO02/070371 A2 | 9/2002 |
| WO | WO 02/097927 | 12/2002 |
| WO | WO02097927 A1 | 12/2002 |
| WO | WO 03039309 | 5/2003 |
| WO | WO 03/075629 | 9/2003 |
| WO | WO 03/093142 A1 | 11/2003 |
| WO | WO 2004/030435 | 4/2004 |
| WO | WO 2004/030438 | 4/2004 |
| WO | WO 2005/099535 | 10/2005 |
| WO | WO 2006/050900 | 5/2006 |
| WO | WO 2006/063645 | 6/2006 |
| WO | WO 2006/082064 | 8/2006 |
| WO | WO 2006/090183 | 8/2006 |
| WO | WO 2006/122916 | 11/2006 |
| WO | WO 2007/003062 | 1/2007 |
| WO | WO 2007/003990 | 1/2007 |
| WO | WO 2007/141334 | 12/2007 |
| WO | WO 2008/046837 | 4/2008 |
| WO | WO 2008/104751 | 9/2008 |
| WO | WO 2008/138710 | 11/2008 |
| WO | WO 2008/138820 | 11/2008 |
| WO | WO 2011/092644 | 8/2011 |

OTHER PUBLICATIONS

Chilean Search Report for CL 3720-08 dated Feb. 7, 2011 (corresponding to US 2010-0263547A1).

CL-2023-07 cited in Chilean Search Report, CL 3720-08 dated Feb. 7, 2011 (corresponding to US 2009-0173235A1).

(56) References Cited

OTHER PUBLICATIONS

International Search Report, PCT/EP2008/067072, mailed Oct. 9, 2009.
International Search Report, PCT/EP2008/067075, mailed Aug. 27, 2009.
International Search Report, PCT/EP2C08/067077, mailed Oct. 14, 2009.
International Search Report, PCT/EP2008/067079, mailed Apr. 9, 2009.
International Search Report, PCT/EP2008/067083, mailed Apr. 16, 2009.
Copy of European Search Report, Application No. Ep 10167803 mailed Aug. 27, 2010.
U.S. Appl. No. 12/747,794, Non-Final Office Action, dated Jan. 30, 2013.
U.S. Appl. No. 12/988,295, Restriction Requirement, dated Aug. 16, 2012.
U.S. Appl. No. 12/747,820, Restriction Requirement, dated Feb. 15, 2013.
U.S. Appl. No. 12/747,684 Non-Final Office Action dated Mar. 11, 2013.
U.S. Appl. No. 12/747,743, Non-Final Office Action dated Apr. 11, 2013.
U.S. Appl. No. 12/988,295, Non-Final Office Action, dated May 6, 2013.
U.S. Appl. No. 12/747,794, Final Office Action, dated Jun. 6, 2013.
U.S. Appl. No. 12/988,295 Final Office Action dated Jul. 24, 2013.
U.S. Appl. No. 12/747,820 Non-Final Office Action dated Aug. 2, 2013.
U.S. Appl. No. 12/747,743 Non-Final Office Action dated Sep. 25, 2013.
U.S. Appl. No. 12/747,684, Final Office Action dated Jul. 30, 2013.
U.S. Appl. No. 12/747,820 Final Office Action dated Dec. 4, 2013.
U.S. Appl. No. 12/747,820 Advisory Action dated Feb. 12, 2014.
U.S. Appl. No. 12/747,743 Notice of Allowance and Fees Due (PTOL-85) dated Apr. 2, 2014.
P007910120—Kaffeevollautomatern Magnifica ll-ESAM 300 B—Mar. 12, 2007.
U.S. Appl. No. 12/747,684, Advisory Action, dated Nov. 13, 2013.
U.S. Appl. No. 12/988,295, Notice of Allowance, dated Dec. 2, 2013.
U.S. Appl. No. 12/747,820, Final Office Action, dated Dec. 4, 2013.
Japanese Office Action, Application No. P2013-170594, dated Jun. 24, 2014 with English translation for relevant portion(s) of JP references JP62100138 and JP55128626.
U.S. Appl. No. 12/747,684 Non-Final Office Action, May 27, 2014.
U.S. Appl. No. 12/747,794, Non-Final Office Action, Jul. 29, 2014.

* cited by examiner

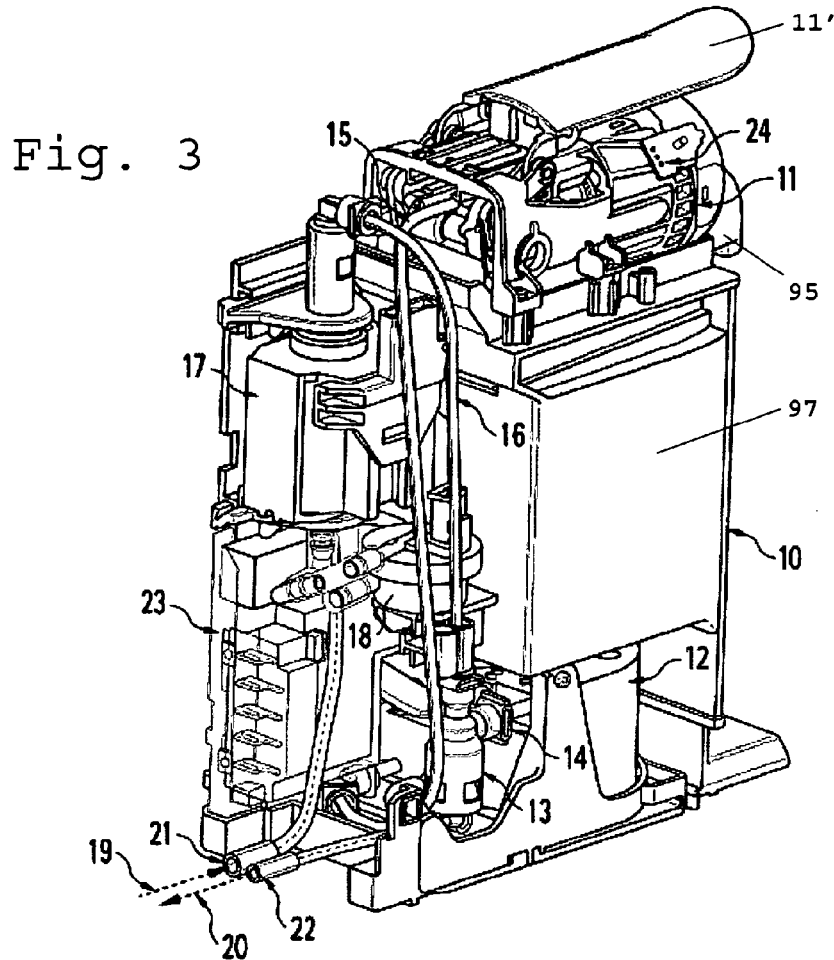
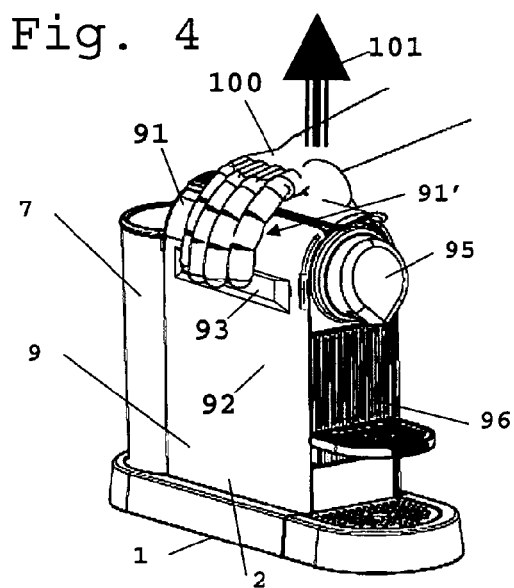
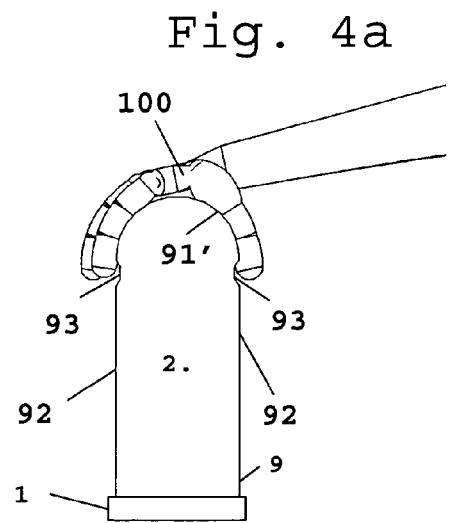

ONE HAND CARRIABLE LIQUID FOOD OR BEVERAGE MACHINE

This application is a 371 filing of International Patent Application PCT/EP2008/067075 filed Dec. 9, 2008.

FIELD OF THE INVENTION

The field of the invention pertains to liquid food or beverage machine, in particular to the ability to displace such machines.

BACKGROUND ART

Certain beverage or food preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

Such machines are usually arranged to placed at some convenient location on a support surface in a kitchen or bar or in an office or in another suitable environment, typically close to the mains and to a source of water such as close to the kitchen sink, and are not easily movable. This is inconvenient when the machine or the supporting surface needs to be cleaned or the machine moved. When this happens, the user tends to seize the machine wherever he manages to find some gripping means, e.g. at the outlet nozzle, at the drip tray, by the machine's opening for the drip tray or waste ingredient container, under the machine's bottom . . . in an unreliable manner which may lead to dropping the machine or to the falling out/off of some movable parts of the machine, such as the already mentioned drip tray, waste ingredient collector or even the water reservoir.

Moveable coffee machine are already known. EP 1 878 368 discloses a beverage machine having a functional block that is rotatably mounted on a support base. The functional block can be designed to be removable from the support base. EP 1 864 598 discloses an autonomous beverage machine that can be mounted onto a docking station. The beverage machine is arranged to be operable whether connected to the docking station or disconnected therefrom.

However, there is still a need to provide a coffee machine arranged so that is can be easily lifted and/or carried around by a user.

SUMMARY OF THE INVENTION

It is a preferred object of the present invention to provide a liquid food or beverage preparation machine with a simple arrangement for allowing a user to displace safely a machine.

The invention thus relates to a machine for preparing a liquid food or beverage, in particular from a pre-portioned beverage or food ingredient such as an ingredient contained in a capsule or pod.

The machine comprises an outermost housing that has a top part and downwardly extending sidewalls which cover and shield at least part of a liquid food or beverage module arranged for receiving an ingredient and feeding a liquid to the ingredient.

For instance, the machine is a coffee, tea or soup machine, in particular a machine for preparing within such module a beverage or liquid food by passing hot or cold water or another liquid through a capsule or pod containing an ingredient of the beverage or liquid food to be prepared, such as ground coffee or tea or chocolate or cacao or milk powder.

In accordance with the invention, the downwardly extending sidewalls have a portion that forms, optionally together with a portion of the top part, a grip seizable by a human hand such that the beverage or liquid food machine can be carried and displaced single handed by seizure of said grip.

Preferably, such a grip should be arranged in the sidewalls so that the entire weight of the machine may be supported by the this grip without risk of damage or deformation of the machine, as might for instance happen if a user pulls a machine by seizing an apparent component such as a beverage outlet, an electric cable or a handle closing or opening the brewing unit. The grip should also extend over a sufficient length along the sidewalls and the circumference of the grip should be adapted to the shape and capacity of a normal human hand to allow a firm seizure by the hand, sufficient for the user to safely carry the machine with all its weight. Optionally, the grip arrangement includes a means, such as a surface structure or composition, in particular an anti-skid surface that provides friction against a human hand to reduce the necessary gripping force needed to achieve a reliable gripping.

Hence, the machine of the invention provides a simple gripping arrangement for the user to lift and/or displace the machine. This gripping arrangement may result directly from an appropriate shape of the housing suitable to accommodate for a human hand and for providing a sufficiently safe hand-holding for carrying the machine around, in such a manner that only one hand is required to hold the machine. Consequently, the internal parts of the machine should be arranged correspondingly to fit into such a housing.

The ability to lift a machine single handed allows for instance to lift the machine with one hand wipe and clean the supporting surface, e.g. on a table, with the other hand and replace the machine, in a single operation.

A pair of generally facing and downwardly extending sidewalls may be provided, which have facing vertical or downwardly converging upper parts that form a hand grip arrangement.

Typically, the sidewall portions forming the grip generally face one another and are spaced apart by a distance allowing hand gripping, in particular by a distance in the range of 3 to 12 cm, such as 5 to 10 cm or 7 to 9 cm.

The sidewall portions, and optionally the top part portion, forming the grip may have and anti-skid surface, in particular a textured or striated surface, to facilitate gripping.

The downwardly extending sidewalls forming the grip typically have overhanging upper portions such as downwardly converging portions to facilitate hand gripping. For example, the sidewall portions forming the grip have a recessed arrangement for accommodating human fingers.

The sidewall portions forming the grip may have a protruding arrangement for accommodating human fingers. For instance, the surface of the sidewalls, and optionally of the top part of the housing, may include protruding portions that delimit a counter-shape of human fingers so as to optimise the ergonomics of the grip.

To facilitate lifting and holding of the liquid food or beverage machine, the centre of gravity of the machine is preferably located generally vertically below the grip, or at least below and the grip with a slight lateral off-set, for example by an angle of up to 30 deg such as 3 to 20 deg or 5 to 15 deg relative to the vertical.

The liquid food or beverage machine may have a platform. Such a platform may include at least one of a power supply arrangement, a control system, a pump, a heater and a piping arrangement for circulating liquid, in particular from a reservoir of liquid external to the outermost housing. The liquid food or beverage module with the downward extending sidewalls can be mounted on a platform. The platform may further support other devices such as a milk frothing apparatus. The module with the housing sidewalls can be centred, or it can be off-centred on the platform and extend in particular along an edge of the platform. For instance, the module can be located along one edge of the platform and a further device may be located adjacent the opposite platform edge.

The downwardly extending sidewalls may be generally vertical and cover substantially the entire liquid food or beverage module, the food module being optionally connectable to a source of liquid, such as a liquid reservoir, located outside the outermost housing, as already mentioned.

The downwardly extending sidewalls can be generally parallel and cooperate with the top part, a rear wall, a front wall and a bottom to form the outermost housing, the front wall being usually associated with an outlet for dispensing liquid food or beverage from the module.

The outermost housing may have a width generally corresponding to the spacing of the housing sidewalls, the width being significantly smaller than a length and/or a height of the outermost housing. In this, configuration liquid food and beverage module is arranged to extend in height and/or in depth in the housing, but not significantly in wideness. For example, the width of the outermost housing is typically in the range of 6 to 11 cm, whereas the depth and/or the height of the outermost housing can be of the order of 25 to 35 cm.

Typically, the outermost housing has a front face with a beverage or liquid food outlet. Usually, the outlet cooperates with a drip tray arrangement located underneath for supporting a cup or mug to be filled and for collecting spillages.

Moreover, the housing typically has a rear wall adjacent a liquid reservoir external to the outermost housing. The reservoir is usually in fluid communication with the liquid food or beverage unit and may be mechanically mounted against the rear wall and/or a platform of the machine, as mentioned above. The liquid reservoir can have one or more reservoir walls which is/are generally flush with the housing sidewalls, in particular an upright semi-circular reservoir wall having extremities that are generally flush with the housing sidewalls.

The invention also concerns a machine for preparing a liquid food or beverage, in particular as described above. This machine comprises a housing with facing upright sidewalls that are seizable single-handed and that are spaced apart by a distance in the range of 3 to 12 cm, such as 5 to 10 cm or 7 to 9 cm. These sidewalls optionally extend over substantially an entire outermost depth and/or outermost height of such machine. Typically, these sidewalls are associated with a top part, a rear face and a front face, in particular a front face associated with a liquid food or beverage outlet, to delimit the machine.

Unless specified otherwise, all references to spatial orientations refer to the orientation of the liquid food or beverage machine when operated by a user to prepare liquid food or beverage.

BRIEF DESCRIPTION OF THE DRAWINGS

The invention will now be described with reference to the schematic drawings, wherein:

FIG. 3 shows the internal parts of a liquid food or beverage machine according to the invention;

FIG. 4 illustrates the machine of FIG. 1 when seized and lifted by a user, FIG. 4a being a schematic cross-sectional view of the seized machine illustrated in FIG. 1.

DETAILED DESCRIPTION

Figure 1:
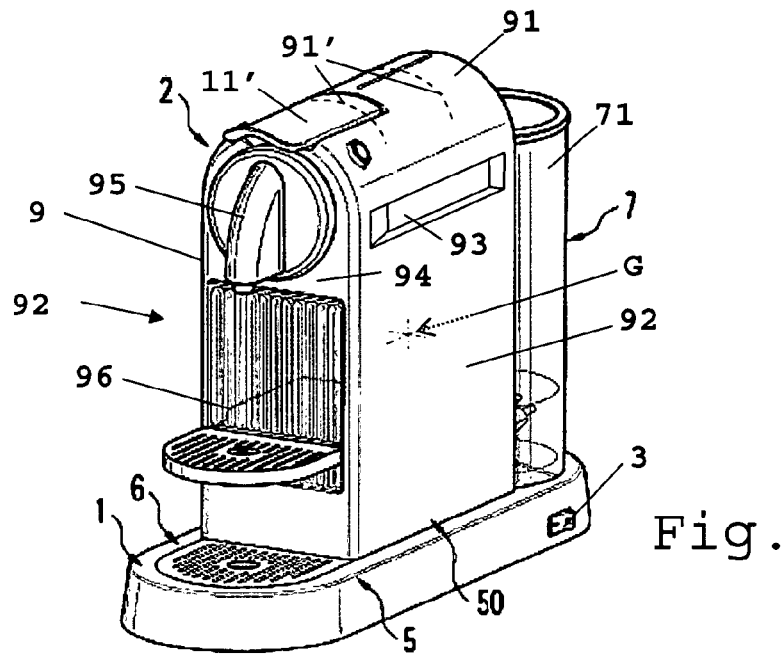
FIGS. 1 and 2 illustrate two different liquid food or beverage machine according to the invention.

FIGS. 1, 4 and 4a illustrate a liquid food or beverage machine, in particular a coffee machine, comprising a core unit 2 and a base platform 1, which can be lifted single-handed.

Core unit 2 has an outermost housing 9 that has a top part 91 and a pair of downwardly extending facing sidewalls 92 which cover and shield at least part of a liquid food or beverage module (shown in FIG. 3).

Core unit 2 has a liquid food or beverage module (shown in FIG. 3) that is enclosed in a housing 9 with downwardly extending sidewalls 92 mounted on platform 1. Sidewalls 92 are generally vertical and parallel and cover substantially the entire liquid food or beverage module. Sidewalls 92 cooperate with a top part 91, a front wall 94, a rear wall facing wall 94 and a bottom 5 to form outermost housing 9. Front wall 94 is associated with a outlet 95 for dispensing liquid food or beverage from the module. Outlet 95 is located above a drip tray device 6 and a user capsule receptacle 96 that is removably inserted into core unit 2.

Base platform 1 has the minimal functions as to the fluid and power management, which is supplying the liquid food or beverage module of core unit 2 with electrical power and with water from a water tank 7 attached to the base platform externally to housing 9 and adjacent to the rear wall of housing 9. Moreover, tank 7 has a semi-circular upright wall 71 with extremities that are generally flush with sidewalls 92 of housing 9.

Base platform 1 according to this example is provided with an integrated electrical circuitry to be connected to the mains. A master switch 3 is provided for switching the machine on and off. Additionally the shown base platform is provided with water feed lines connecting the water tank 7 with a fluid connector arranged at the top surface of the base platform 1, on which top surface the core unit 2 is fixedly mounted.

"Fixedly mounted" indicates that the core unit is mounted on the base platform 1 at the manufacturing site. The mounting thus is "fixed" in the sense that a consumer can not easily detach the core unit from the base platform 1. Preferably the core unit 2 is screwed or bolted to the base platform 1.

Alternatively the core unit 2 can be mounted on the base platform 1 such that a user can detach it, e.g. in order to transport it easily or in order to replace the platform (e.g. by a different one having differing functionalities). This releasable mounting can be achieved e.g. via locking means which can be manually released e.g. via a push-button.

In the shown example, the base platform comprises a base support 5 with a seat 50 to receive the core unit assembly 2, a drip tray 6 and a removable water tank assembly 7.

In accordance with the invention, the downwardly extending sidewalls 92 have portions 93 that form, with a portion of the top part generally delimited by dotted lines 91', a grip arranged to be seizable by a human hand such that said machine can be carried and displaced single handed by seizure of said grip from above.

As illustrated in FIG. 1, sidewalls 92 have a recess 93 extending horizontally over a substantial part of the sidewall's width that can be formed by swaging or moulding. The upper part of recess 93 forms an overhang in the upright sidewall 92 for improving hand gripping. Recess 93 is so dimensioned to accommodate human fingers, in particular the tip thereof. Hence, recess 93 may conveniently have: a width in the range of 0.5 to 4 cm, in particular 1.5 to 2.5 cm; a length in the range of 5 to 20 cm, in particular 8 to 18 cm such as 10 to 15 cm; and a depth in the range of 0.3 to 2 cm, in particular 0.5 to 1.5 cm. FIGS. 4 and 4a illustrate in greater detail the seizure of the machine by a human hand 100 at the level of the grip 91',93 and single-hand lifting of the machine in the direction of arrow 101.

Such a grip arrangement may also include protruding parts extending over the grip (not shown), in particular to form a counter-shape for properly positioning human fingers. To provide a grip for firmly and safely holding single-handed the liquid food or beverage machine, the spacing between the facing continuous sidewalls 92 seizable one-handed may be of the order of 9 to 10 cm.

Hence, the outermost housing of the core unit has a width spacing apart the housing sidewalls, the width being significantly smaller than the length and the height of the outermost housing, to facilitate seizure of the housing by hand. Consequently, the liquid food or beverage module should be arranged to fit into a corresponding tower-like shape, as for instance shown in FIG. 3.

Moreover, the centre of gravity G of the liquid food or beverage machine is located generally vertically below the grip 91',93 so that the machine is well balanced with respect to the grip when lifted by hand.

This liquid food or beverage machine has a housing 9 with facing upright sidewalls 92 that are seizable single-handed and that are spaced apart by a distance in the range of 3.5 to 11.5 cm, such as 5.5 to 10.5 cm or 6.5 to 9.5 cm. Sidewalls 92 extend over substantially an entire outermost depth and/or outermost height of such machine. Sidewalls 92 are associated with a top part 91, a rear face and a front face 94 associated with an outlet 95, to delimit the machine.

Figure 2:
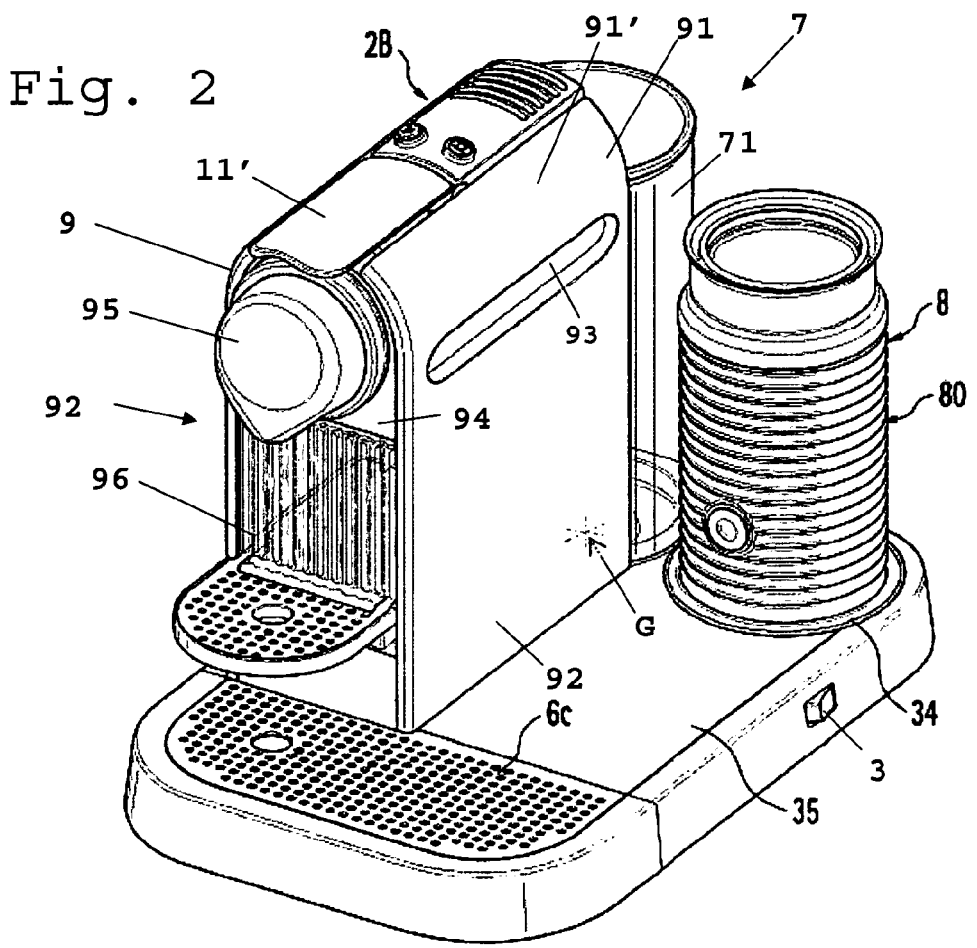

In FIG. 2, in which the same numeric references generally designate the same elements, the core unit 2B is similar to the core unit described in relation with FIG. 1.

In accordance with the invention, the downwardly extending sidewalls 92 have portions 93 that form, with a portion of the top part generally delimited by dotted lines 91', a grip arranged to be seizable by a human hand such that said machine can be carried and displaced single-handed by seizure of said grip from above.

The base platform 6C may have a cordless milk frothing assembly 8. Therefore, the base platform comprises a dedicated area 34 forming support with a cordless electrical connection able to receive in a removable manner a milk frothing jug 80. The milk jug has mechanical whipping elements for whipping liquid milk. A description of a cordless milk frothing assembly itself is for example described in detail in WO 2006/050900.

The base platform may also comprise a cup support area 35. This support area can comprise heating elements, e.g., a resistive heating surface for maintaining the cups at a warm temperature. The heating elements can be switched on as soon as the platform is supplied in current of the main.

It can be noted that the base platforms provide the water and electrical supplies to the core unit. Peripheral functions can be provided such as milk frothing function, cup heating function, a hot water delivery (e.g., by a heating water kettle) additional brewing capacity, etc. The base platform does not need to receive an electronic circuitry although such circuitry is not to be excluded if complex functions would require a specific control, e.g., independent from the control of the core unit. In case, the platform would require a control circuitry, the core unit can work as a master unit and the base platform as a slave unit or vice versa.

The centre of gravity G of the liquid food or beverage machine is located generally vertically below the grip 91', 93. However, unlike the machine shown in FIG. 1, the centre of gravity is not locate generally centrally under the grip but much closer to sidewall 92 adjacent to frothing assembly 8 whereby the machine is slightly unbalanced with respect to the grip when lifted by hand. However, such an unbalancing does not significantly affect the ability to lift the machine single-handed via the grip.

Depending on the accessory 8, in particular its weight, next to core unit 2 it is even possible that the centre of gravity is located outside core 2, slightly laterally off-set from the grip. This however does not prevent a user from holding and lifting the machine by the grip.

In FIG. 3 is illustrated an inside view of a core unit of the system, in particular the liquid food or beverage module 10 located in an outermost housing.

Module 10 includes a brewing unit 11 that comprises an opening and closure handle 11' and means for holding a substance containing capsule, e.g., a coffee capsule, and liquid food or beverage delivery means such as a duct 95.

The holding means typically comprises a capsule holder and brewing cage, a fluid injection system for injecting water in the capsule and a closure device such as a lever and a knee joint mechanism. Suitable extraction modules are described in EP 1 859 713.

A water heater such as a thermo-block 12 or similar thermal bloc inertia-type heaters is provided in module 10. The water heater is connected to the brewing unit 11 via a priming valve 13 and soft tubular lines 14, 15. For ease of connection, clipping means may be used to connect the tubular lines to the different elements.

A pressure pump 17 is provided to supply water to the water heater at a high pressure. Therefore, the pressure pump is associated to the water heater by means of a soft tubular line 16. The pump can be a piston pump. A flow meter 18 is also provided upstream the pump to count the volume of water sucked by the pump and distributed to the water heater, and therefore to enable a precise liquid food or beverage volume management. Water line 19 represents the cold water entering the water connection entry 21 and leading to the flow meter 18. Water line 20 represents the cold water line exiting the water connection exit 22 coming from the priming valve 13. This line 20 is to balance the pressure in the fluid circuit by purging air and/or water during the priming operation of the system. The valve is described in greater details in EP 1 798 457.

An electronic circuitry 23 is also disposed in module 10 to control the different elements of the core unit, in particular, the water heater, the pump and the flow meter. One or two button prints 24 are also placed on the side of the module which are electronically connected to the electronic circuitry 23. These are known per se and typically soft pads enabling to open/close the electronic circuit for running the pump. Each print 24 may serve for a programmed volume of water to be pumped corresponding to a beverage size, e.g., a short espresso coffee of 40 mL or a long coffee cup of 110 mL.

As illustrated, to fit between panels 92, liquid food or beverage unit 10 is compact. Unit 10 is tightly arranged around inner housing 97 for receiving a drip tray device with a user capsule receptacle (not shown).

Figure 5:
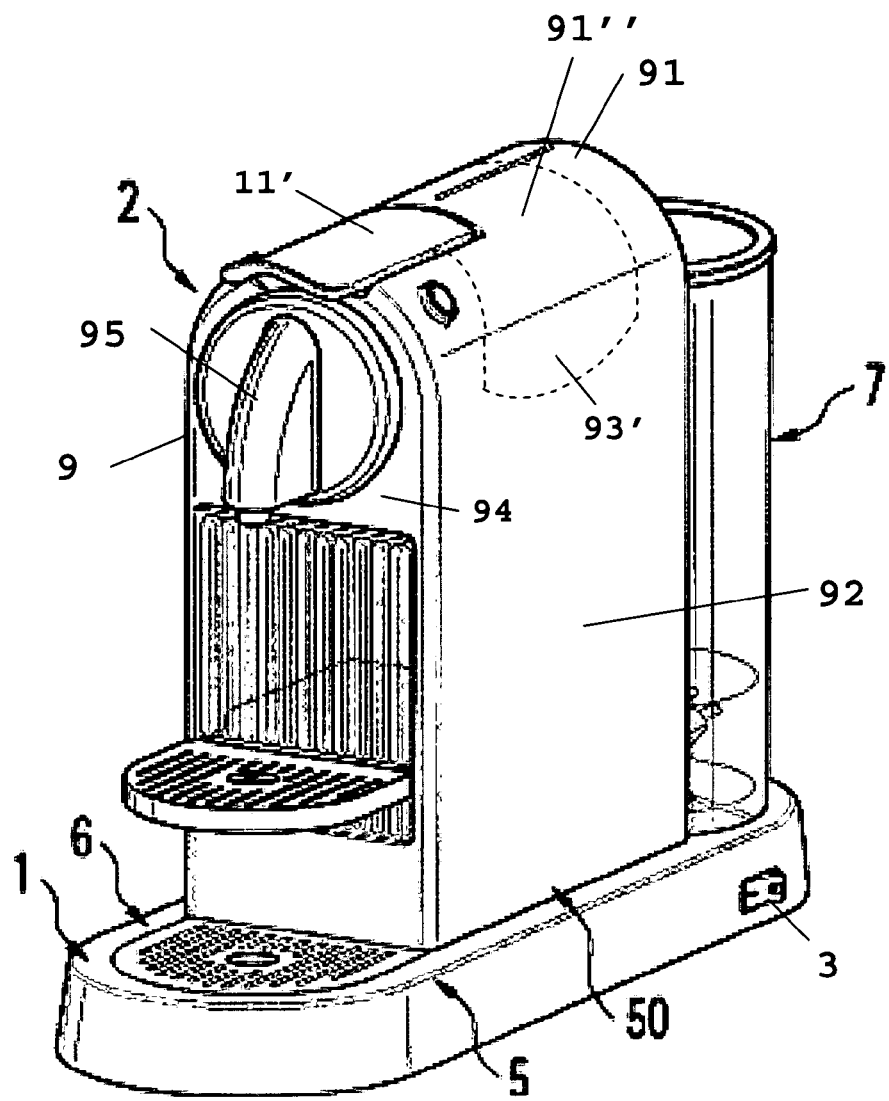
FIG. 5 illustrates a variation according to the invention of the machine of FIGS. 1 and 3.

The liquid food and beverage machine shown in FIG. 5, in which the same numeric references generally designate the same elements, is similar to the one shown in FIGS. 1 and 3.

However, housing 9 shown in FIG. 5 has a top part 91 and sidewalls 92 with striated portions 91" and 93', delimited in FIG. 5 by the corresponding dashed lines, to facilitate gripping. It is of course possible to combine the recess gripping arrangement illustrated in FIGS. 1 and 3 with the anti-skid surface shown on housing 9 of the machine of FIG. 5.

What is claimed is:

1. A machine for preparing a liquid food or beverage from a pre-portioned beverage or food ingredient, comprising:
    a beverage or liquid food ingredient capsule holder, a used capsule receptacle and a drip tray for collecting drips of beverage or liquid food, all of which are associated with the housing and contribute to the weight of the machine;
    an outermost housing that has a top part and downwardly extending sidewalls which cover and shield at least part of the beverage or liquid food module that is arranged for receiving an ingredient and feeding a liquid from a liquid source in the machine to the ingredient;
    a pump, a heater and a piping arrangement enclosed within the outermost housing for circulating the liquid from the liquid source, wherein the outermost housing has a rear wall adjacent a liquid reservoir external to the outermost housing, and wherein the liquid reservoir has one or more reservoir walls which is/are generally flush with the housing sidewalls; and
    wherein the downwardly extending sidewalls have a portion that forms, together with a portion of the top part, a grip arranged in or on the sidewalls of the housing above a center of gravity of the machine so that all weight of the machine is supported when the machine is carried by the grip without risk of damage or deformation of the machine, with the center of gravity located generally vertically below the grip, wherein the grip extends over a sufficient length along the sidewalls and having a circumference such that the machine can be carried and displaced single handedly by seizure of the grip by an average size adult human hand so that the user can safely carry the machine with one hand; and
    wherein the grip that is formed by the portion of each downwardly extending sidewall is a longitudinal recess so that the recess in one sidewall can be grasped by the thumb of the adult human's hand and the recess in the other sidewall can be grasped by the fingers of the adult human's hand while the palm of the adult human's hand contacts the top of the machine.

2. The machine of claim 1, further comprising a pair of generally facing and downwardly extending sidewalls having facing vertical or downwardly converging upper parts that form a hand grip arrangement.

3. The machine of claim 2, wherein the sidewall portions forming the grip are spaced apart by a distance in the range of 3 to 12 cm.

4. The machine of claim 1, wherein the downwardly extending sidewalls forming the grip have overhanging upper portions to facilitate hand gripping.

5. The machine of claim 1, wherein the sidewall portions forming the grip have a recessed and/or protruding arrangement for accommodating the fingers of the adult human's hand.

6. The machine of claim 1, which has a center of gravity that is located below the grip and laterally off-set thereto by an angle of up to 30 degrees.

7. The machine of claim 1, wherein the liquid food or beverage module and the downward extending sidewalls are mounted on a platform.

8. The machine of claim 7, wherein the sidewalls and the module are off-centred on the platform, and extend in particular along an edge of the platform.

9. The machine of claim 1, wherein the downwardly extending sidewalls are generally vertical, continuous and cover substantially the entire liquid food or beverage module, the food module being connectable to a source of liquid.

10. The machine of claim 1, wherein the source of liquid is a liquid reservoir located outside the outermost housing.

11. The machine of claim 1, wherein the downwardly extending sidewalls are generally parallel and cooperate with the top part, a rear wall, a front wall and a bottom to form the outermost housing, the front wall being optionally associated with an outlet for dispensing liquid food or beverage from the module.

12. The machine of claim 1, wherein the outermost housing has a width spacing apart the housing sidewalls, the width being significantly smaller than a length and/or a height of the outermost housing.

13. The machine of claim 1, wherein the outermost housing has a front face with a beverage or liquid food outlet.

14. The machine of claim 1, wherein the liquid reservoir has at least one upright semi-circular reservoir wall having extremities that are generally flush with the housing sidewalls.

15. The machine of claim 1, wherein the sidewalls extend over substantially an entire outermost depth or outermost height of such housing.

16. A machine for preparing a liquid food or beverage from a pre-portioned beverage or food ingredient, comprising:
    a beverage or liquid food ingredient capsule holder, a used capsule receptacle and a drip tray for collecting drips of beverage or liquid food, all of which are associated with the housing and contribute to the weight of the machine;
    an outermost housing that has a top part and downwardly extending sidewalls which cover and shield at least part of the beverage or liquid food module that is arranged for receiving an ingredient and feeding a liquid from a liquid source in the machine to the ingredient, wherein the downwardly extending sidewalls are spaced apart by a distance in the range of 3 to 12 cm in order to be seizable single-handedly by an average size adult human hand;
    a pump, a heater and a piping arrangement enclosed within the outermost housing for circulating the liquid from the liquid source, wherein the outermost housing has a rear wall adjacent a liquid reservoir external to the outermost housing, and wherein the liquid reservoir has one or more reservoir walls which is/are generally flush with the housing sidewalls; and
    wherein the downwardly extending sidewalls have a portion that forms, together with a portion of the top part, a grip arranged in or on the sidewalls of the housing above a center of gravity of the machine so that all weight of the machine is supported when the machine is carried by the grip without risk of damage or deformation of the machine, with the center of gravity located generally vertically below the grip, wherein the grip extends over a sufficient length along the sidewalls and having a circumference such that the machine can be carried and displaced single handedly by seizure of the grip by the adult human's hand so that the user can safely carry the machine with one hand; and
    wherein the grip that is formed by the portion of each downwardly extending sidewall is a longitudinal recess so that the recess in one sidewall can be grasped by the thumb of the adult human's hand and the recess in the other sidewall can be grasped by the fingers of the adult human's hand while the palm of the adult human's hand contacts the top of the machine.

17. A machine for preparing a liquid food or beverage from a pre-portioned beverage or food ingredient, comprising:

a beverage or liquid food ingredient capsule holder, a used capsule receptacle and a drip tray for collecting drips of beverage or liquid food, all of which are associated with the housing and contribute to the weight of the machine;

an outermost housing that has a top part and downwardly extending sidewalls which cover and shield at least part of the beverage or liquid food module that is arranged for receiving an ingredient and feeding a liquid from a liquid source in the machine to the ingredient, wherein the downwardly extending sidewalls are spaced apart by a distance in the range of 3 to 12 cm in order to be seizable single-handedly by an average size adult human hand;

a pump, a heater and a piping arrangement enclosed within the outermost housing for circulating the liquid from the liquid source, wherein the outermost housing has a rear wall adjacent a liquid reservoir external to the outermost housing, and wherein the liquid reservoir has one or more reservoir walls which is/are generally flush with the housing sidewalls; and wherein the downwardly extending sidewalls have a portion that forms, together with a portion of the top part, a grip arranged in or on the sidewalls of the housing above a center of gravity of the machine so that all weight of the machine is supported when the machine is carried by the grip without risk of damage or deformation of the machine, with the center of gravity located generally vertically below the grip, wherein the grip extends over a sufficient length along the sidewalls and having a circumference such that the machine can be carried and displaced single handedly by seizure of the grip by the adult human's hand so that the user can safely carry the machine with one hand; and wherein the portion of each downwardly extending sidewall that forms the grip includes a surface structure or composition that provides an anti-slip surface and sufficient friction to facilitate gripping by the adult human's hand and fingers.

* * * * *